United States Patent [19]

Halker et al.

[11] 4,445,032

[45] Apr. 24, 1984

[54] METHOD OF DETERMINING THE BULK STRENGTH OF STRATA

[75] Inventors: Anthony Halker, Stoke-on-Trent; David W. Mellor, Congleton; Keith R. Whitworth, Castle Bank; Nicholas J. Kuszner, Audlem, all of England

[73] Assignee: Coal Industry (Patents) Limited, London, England

[21] Appl. No.: 313,427

[22] Filed: Oct. 20, 1981

[30] Foreign Application Priority Data

Oct. 21, 1980 [GB] United Kingdom ............... 80/33883
May 15, 1981 [GB] United Kingdom ............... 81/14912

[51] Int. Cl.³ ............................................. G01V 5/00
[52] U.S. Cl. .................................... 250/256; 250/270
[58] Field of Search ............... 250/253, 256, 259, 268, 250/269, 270

[56] References Cited

U.S. PATENT DOCUMENTS

| 2,936,375 | 5/1960 | McKay | 250/270 |
| 3,838,279 | 9/1974 | Schultz et al. | 250/269 |
| 4,134,011 | 1/1979 | Smith, Jr. et al. | 250/269 |
| 4,350,887 | 9/1982 | Barnard et al. | 250/269 |

Primary Examiner—Janice A. Howell
Attorney, Agent, or Firm—James Creighton Wray

[57] ABSTRACT

The bulk rock strength of strata is determined by logging a borehole with an instrument to obtain a Neutron-Neutron log or a Hydrogen Index log of the hole and determining from the log in conjunction with the lithology of the strata the strength of the strata rocks by applying an inverse relation formula.

23 Claims, 8 Drawing Figures

METHOD OF DETERMINING THE BULK STRENGTH OF STRATA

This invention comprises a technique of determining the bulk strength of rocks encountered in boreholes.

In all mineral extraction methods it is extremely useful to personnel involved in planning and working the extractions to be able to determine not only the nature and depth of various minerals and rocks but also their relative strength. Data pertaining to the relative strengths of rocks likely to be encountered in a scheme of operations is of importance on two accounts: firstly, in ensuring that necessary support action is taken to enable the extraction to take place in a safe environment, and secondly, that the extraction proceeds in the most economically efficient manner.

In order to determine the nature of strata it has been the practice for many years for boreholes to be drilled vertically from the surface to determine the exact positions and materials of the strata. In coal mining, boreholes may typically be up to 1400 meters deep and have a diameter of 0.25 meters.

Boreholes yield two types of rock samples: firstly, "cutting samples" which are small fragments of rock produced by a tool which completely grinds the rock away in producing the borehole; secondly, continuous cylinders of core produced by a tool which cuts a narrow annulus of rock away. Since coring is roughly twice the cost of rock-bitting, a typical borehole may have the top section rock-bitted and the subsequent portion of interest cores.

The materials produced by the coring method are used to give a variety of information, the most obvious of which is the precise nature of the strata through which the coring tool has passed. Another important piece of information is the Fracture Index log (sometimes referred to as Crack Density Log) which is derived from the core and which is used to indicate the strength of the rock.

It is conventional to record from an examination of the core sample the exact depth of every fracture in the core when compiling a Fracture Index Log. This affords the opportunity at a later date to express the Fracture Index as the number of fractures per unit length over any chosen unit length (e.g., 40 cm, 60 cm, 100 cm, 200 cm, etc.). The Fracture Index Log may be used as the basis to produce other logs, e.g., Rock Quality Designation (R.Q.D.).

Once a borehole has been made further information can be obtained relating to the strata by logging the borehole. One log which is often obtained is a Neutron-Neutron log whilst another is a Caliper Log.

The Neutron-Neutron log is obtained by using a standard down-hole geophysical tool. The equipment comprises a neutron source and a neutron detector which are separated by a fixed distance characteristic of that particular tool (hence short-spaced neutron-neutron, long-spaced neutron-neutron, etc.). In principle the source continually emits fast neutrons. Neutrons lose more energy per collision when the nuclei with which they collide have comparable mass. Hence the rate of energy loss (moderation) of fast neutrons is proportional to the density of protons (which have nearly the same mass as the neutrons). After the neutrons have been slowed (to so-called thermal energies), they may be captured by nuclei which then emit high energy capture gamma rays.

The prime response of fast neutrons in the borehole environment is to be slowed by interaction with hydrogen in combination with other elements (mostly commonly with oxygen as water). Therefore, making the detector respond to thermal neutrons (neutron-neutron tool) or alternatively capture gamma rays (neutron-gamma tool) gives an indication of the amount of hydrogen present in the borehole environment which is identified as a hydrogen index. The output of the detector is used to produce a neutron or gamma log. Neutron logs are often scaled in counts per second (c.p.s.) or American Petroleum Institute units (A.P.I.) or Standard Neutron Units (S.N.U.) as is explained later. It is an object of the present invention to provide an improved method of determining the bulk strength of rock in a strata using a logging technique.

According to a first aspect of the present invention a method of determining the bulk rock strength of strata includes the steps of drilling a borehole in strata, moving an instrument along the borehole and determining a Hydrogen Index Log of the strata through which the instrument passes, determining for the strata surrounding the hole the lithology of the strata, progressively modifying the Hydrogen Index Log by a predetermined mathematical function (the calibration constant) for each lithology group encountered in the borehole to produce a modified Hydrogen Index Log and deriving therefrom the bulk rock strengths of the strata through which the borehole was drilled.

According to a second aspect of the present invention a method of determining the bulk rock strength of strata includes the steps of drilling a borehole in strata, moving an instrument along the borehole and determining a Neutron-Neutron Log of the strata through which the the instrument passes, determining for the strata surrounding the hole the lithology of the strata, progressively modifying the Neutron-Neutron Log by a predetermined mathematical function (the calibration constant) for each lithology group encountered in the borehole to produce a modified Neutron-Neutron Log and deriving therefrom an indication of the bulk rock strengths of the strata through which the borehole was drilled.

The bulk rock strength Z can be given in the form:

$$Z = (a/x) + b$$

where a and b are derived calibration constants for each lithological group or sub-division of a group and x is the Neutron-Neutron log. It will be appreciated that the Bulk Rock Strength log may be considered as being effectively a synthesized Fracture Index (or Crack Density) log.

The above form of the relationship is not fundamental to the technique—any polynomial or the form $Z = f(x)$ (or other mathematical function) which can be fitted to the data can be used and the appropriate calibration constants determined—there is no reason why different polynomials should not be fitted to different lithology groups or subdivisions. An inverse relationship is expressed only for simplicity's sake.

The Neutron-Neutron log (or neutron-gamma) tool response is contributed to by the drilling mud within the borehole in addition to material within the borehole wall. The drilling mud contribution is partly controlled by borehole diameter. Variation in borehole diameter (rugosity) therefore may partly contribute to the Neutron-Neutron tool response variation. The rugosity is measured by logging the borehole with a caliper log which follows the contours of the borehole and gives an output which is directly related to the width of the borehole. Rugosity may, in part, be related to lithological type and in this situation the effect of varying rugosity in the calculation of a bulk rock strength log from the Neutron-Neutron log is already accomodated by deriving the calibration constants of the above equation for each lithology group. However, rugosity may vary independently of lithology and therefore the bulk rock strength log could be derived from a mathematical relationship in which bulk rock strength is both a function of Neutron-Neutron response and caliper value. This may simply be achieved by obtaining the calibration constants of the above equation as a function of caliper value. Thus, if required, the method can include the further step of using a caliper log to provide information to correct for borehole rugosity when deriving the bulk strength log.

The lithology of the strata which the borehole encounters may be obtained from a Fracture Index log of the core, this is preferably obtained by visual examination of core produced in forming the borehole although it may be obtained by a geologist's interpretation of (other) conventional down-hole geophysical logs or by computer processing of (other) conventional down-hole geophysical logs.

The bulk rock strength log may be also derived from a neutron-gamma log. The Neutron-Neutron or Neutron-Gamma log is preferably filtered and a filtering factor may be applied to the Fracture Index log for the purpose of establishing calibration constants.

The method may include the further step of applying a filtering factor to the lithology log with the provision that the filtering factor may only smooth over continuously similar sections of a particular subgroup, and with the further provision that any lithology units contaminated as a result of the smoothing process are eliminated from calculations of the calibration constants.

In order that the invention may be readily understood two applications of the method thereof to the logging of the borehole will now be described, by way of example only, with reference to the eight charts in the accompanying drawings. In the drawings the first aspect of the invention is shown in relation to FIGS. 1-4 in which.

Figure 1:
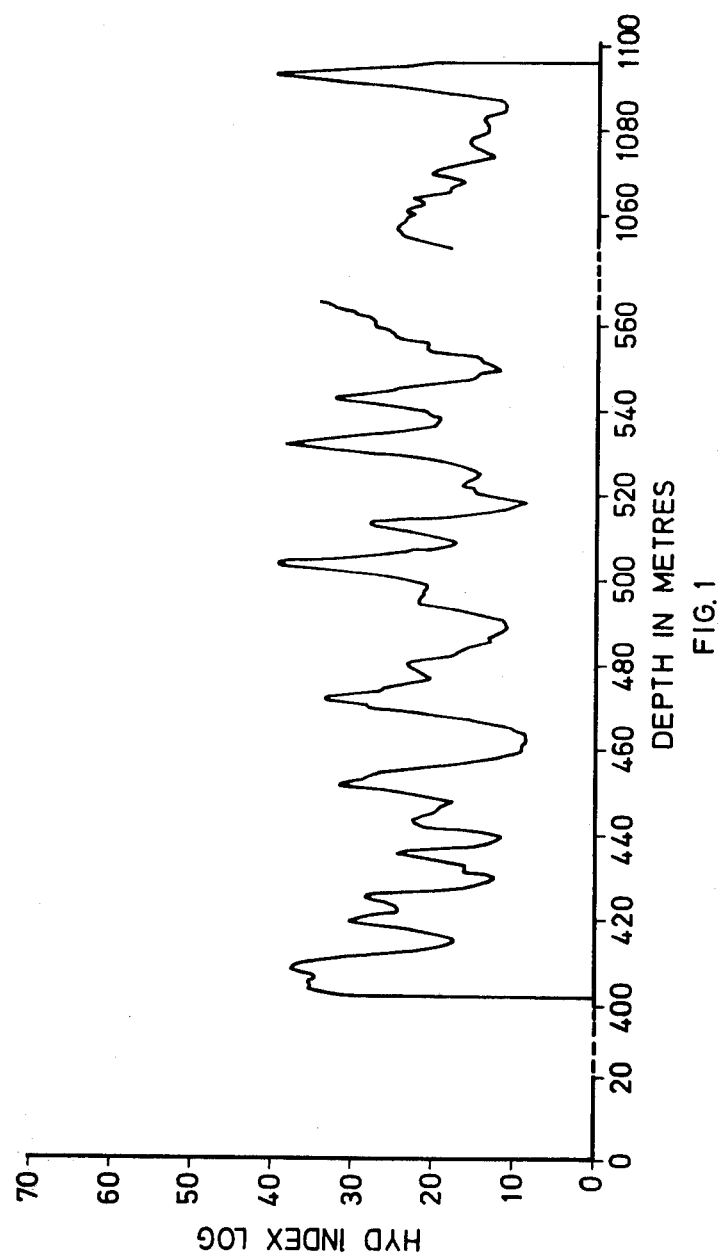
FIG. 1 shows a plot of the Hydrogen Index log against depth.
Figure 2:
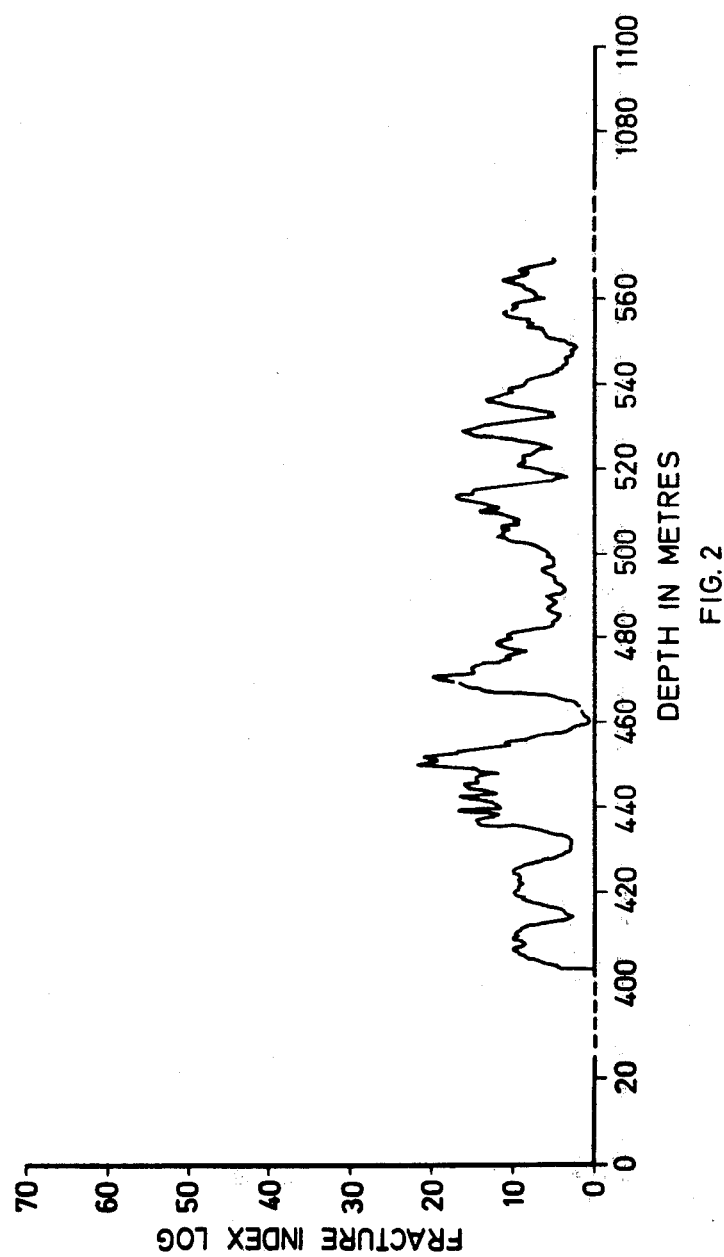
FIG. 2 shows a plot of the Crack Density or Fracture Index log against depth.
Figure 5:
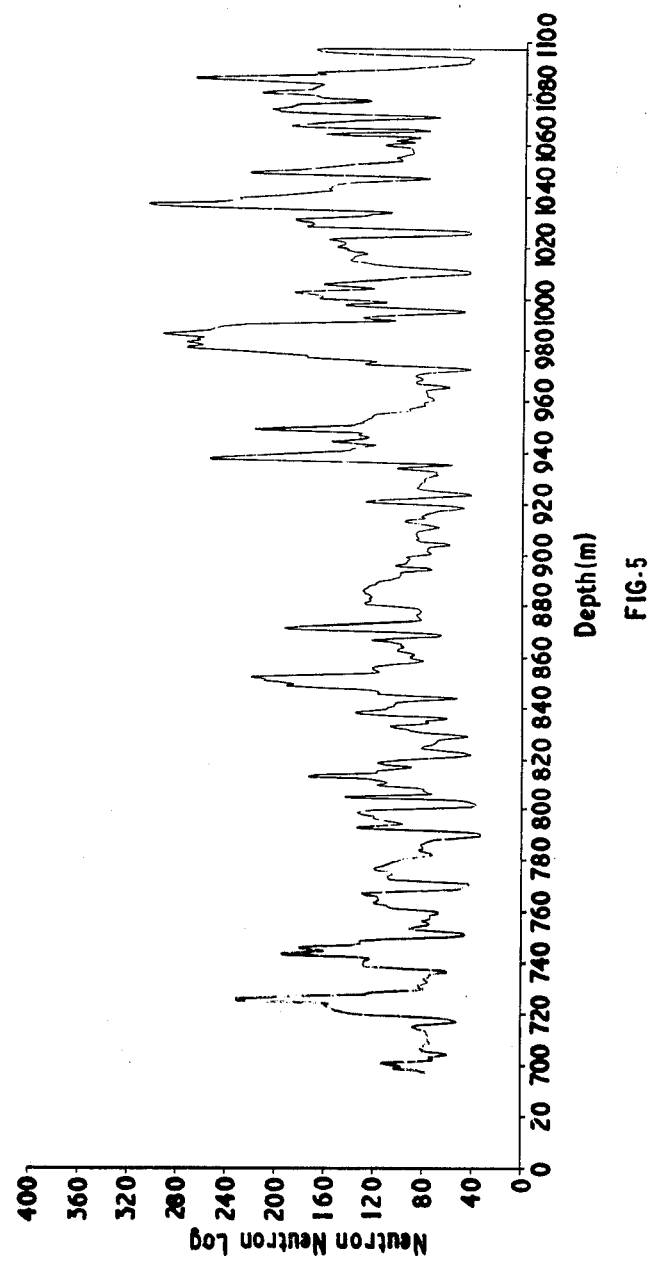
Figure 6:
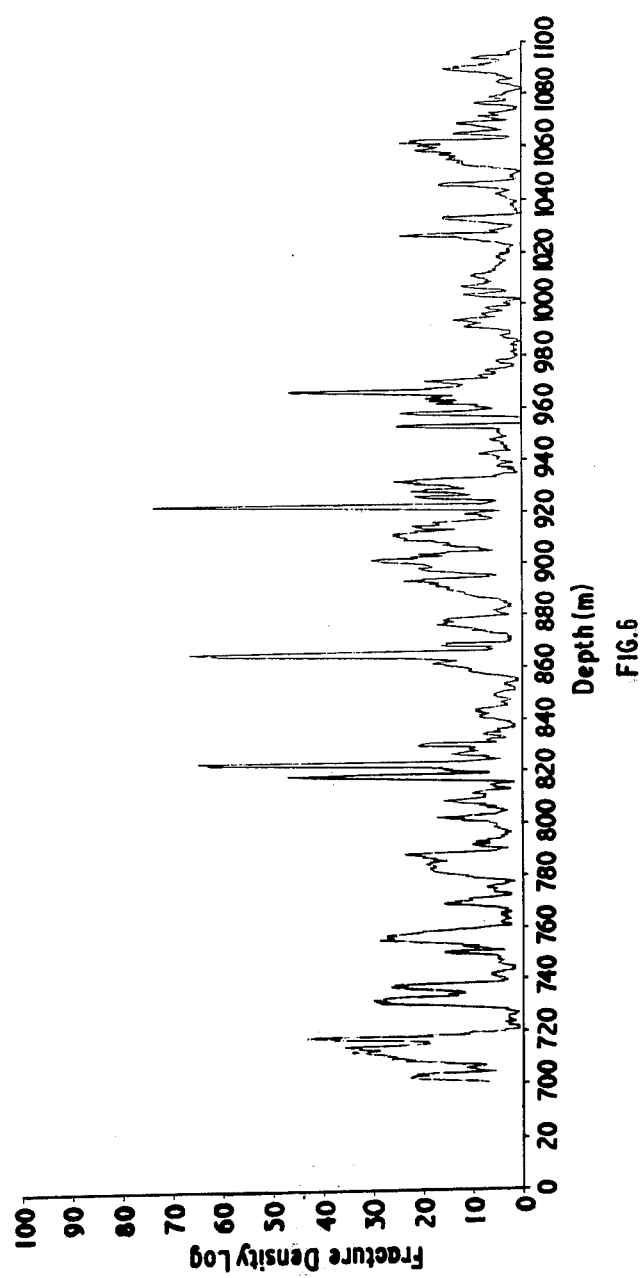
Figure 7:
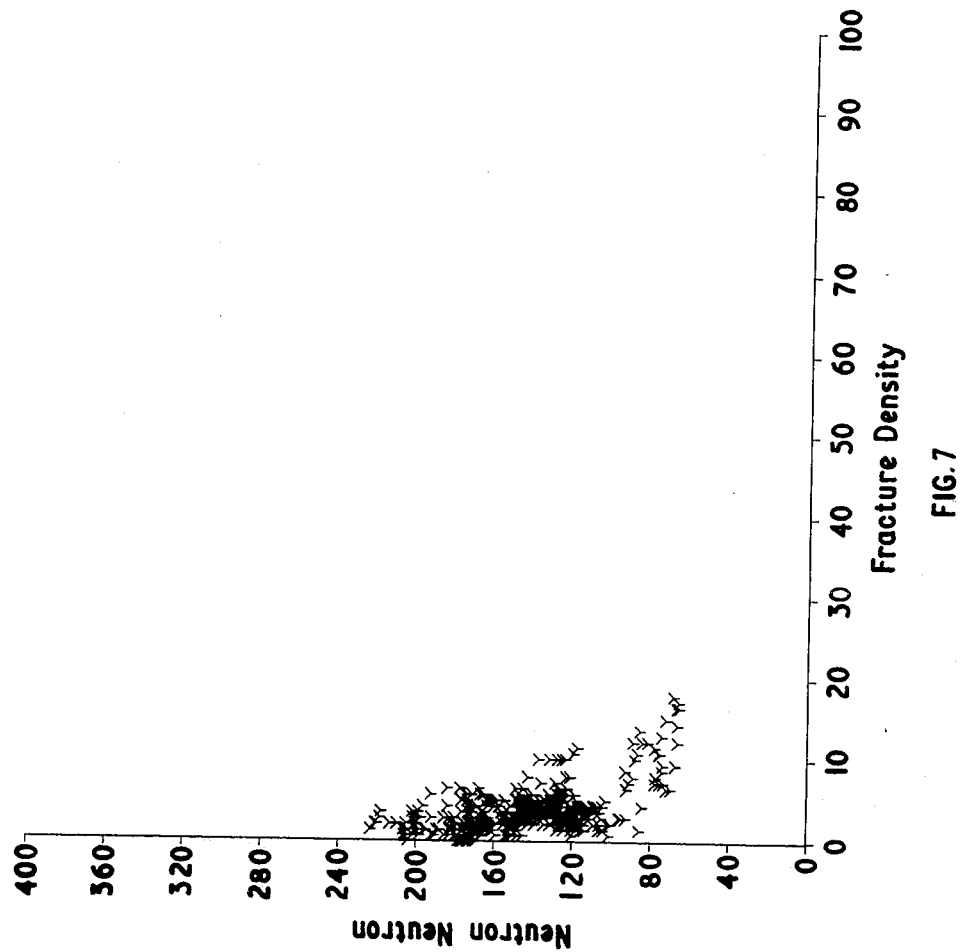
Figure 8:
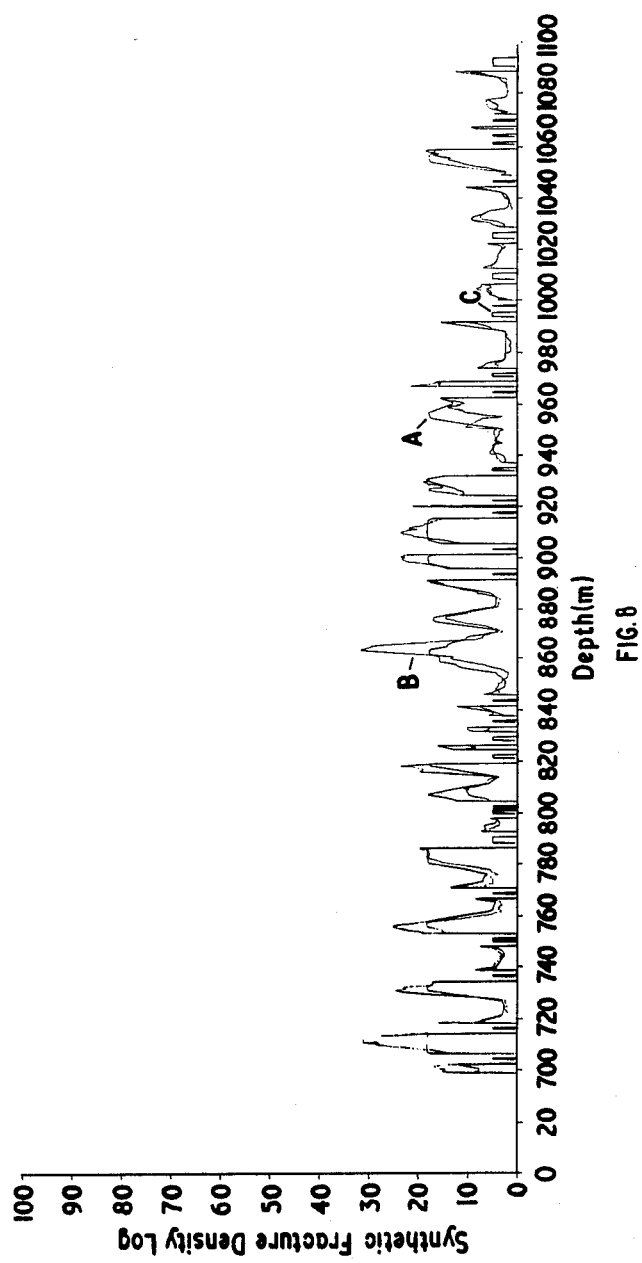

The second aspect of the invention is illustrated with reference to FIGS. 5-8 in which:

FIG. 5 shows a plot of the Neutron-Neutron log against depth;

FIG. 6 shows a plot of the Fracture Density log against depth;

FIG. 7 is a plot of the Neutron-Neutron log of FIG. 1 against the Crack Density log of FIG. 2, for one lithology group; and FIG. 8 is a plot of the Bulk Rock Strength and fracture density. Bulk Rock Strength is obtained by modifying the Neutron-Neutron log according to this invention, superimposed on the synthetic Fracture Density log for the purposes of comparison.

The basic technique applied in both aspects of the invention are the same. Initially a borehole was drilled vertically from the surface through strata known to contain coal measures to the depth of 1100 meters. The first 400 meters were drilled by rock-bitting where the drill carried a drill bit which ground away at the material which was continuously flushed away to the surface. Below 400 meters drilling was continued by a coring drill which ground out an annulus of rock which was flushed to the surface but retained a core of material in the barrel of the drill. This barrel was periodically withdrawn to the surface for examination and removal of the core. A distance log was kept of the position of the drill in the borehole so that the nature of the material produced by the coring technique could be directly identified with the location of the strata.

The lithology of the strata was then classified by visual inspection. A series of numbers was then accorded to the materials of the strata according, in this example only, to the following sub-divisions:

| LITHOLOGY | LITHOLOGY NUMBER |
|---|---|
| COAL | 1 |
| M/S S.M. | 2 |
| M/S SL. SILTY | 2 |
| S/D. M/S. S.M. | 3 |
| S/D. M/S. SL. SILTY | 3 |
| M/S. SILTY | 4 |
| M/S SILTY WITH IRONSTONE BANDS | 5 |
| SILTS FINE GR. | 5 |
| SILTS MED. GR. | 5 |
| SILTS COARSE GR. | 6 |
| SAND FINE GR. | 6 |
| SAND MED. GR. | 6 |
| SAND COARSE GR. | 7 |
| GRIT | 7 |
| CONGLOM | 7 |

(M/S = Mudstone)
(S/E = Seatearth)
(S.M. = smooth)
(SL. = slightly)
(GR. = grain size)

The lithology log was then entered into a computer at the chosen basic sampling interval of 20 cm in these samples, using the relevant lithology numbers.

It will be appreciated that, once obtained, the lithological constants or numbers shown can be applied, with modifications if necessary, to other boreholes in the same or other localities.

Once the borehole has been drilled it can be logged by slowly winching a device from the bottom of the borehole surface whilst recording the variations in electrical signals which the device transmits to surface recording instruments via the (dual purpose) winching cable.

Examples of various types of geophysical logs are given in a paper entitled, "Exploration 2000", by R. H. Hoare in "The Mining Engineer", August 1979, Pages 131-140.

The logs taken were, in the first example, a Hydrogen Index log and in the second example a Neutron-Neutron log, both obtained by winding a Neutron-Neutron log device down the borehole and logging the Neutron-Neutron tool response from 400 meters downwards to give the logs shown in FIGS. 1 and 5. In these figures the ordinate of FIG. 1 gives the Hydrogen Index and of FIG. 5 the Neutron-Neutron response. The hydrogen Index ordinate is on a scale of 1-100 and that of the Neutron-Neutron log of 0 to 400 while the abscissa of both logs gives the depth in meters.

Once obtained the appropriate log was then entered into a computer at the chosen basic sampling interval of 20 cm.

In order to determine the calibration constants the Fracture Index log was then entered into the computer at the chosen basic sampling interval of 20 cm. These logs are shown respectively in FIGS. 2 and 6 plotted against the depth in meters.

Prior to establishing the calibration constants a filtering factor is applied to the Hydrogen Index Log, the Neutron-Neutron log and the Fracture Index Log before cross-plotting. Filtering has been effected by smoothing over a number (L) of basic sample intervals such that:

L=1 no smoothing, raw data at basic sampling interval of 20 cm.
L=3 smoothed over 40 cm., i.e., 20 ×(L−1) cm.
L=7 smoothed over 120 cm.
L=21 smoothed over 400 cm.

This amounts to simple running average smoothing, other forms of filtering could equally well be applied.

For the particular lithology group or sub-division under examination in this example a range of 'L' values is used in both the Hydrogen Index/Fracture Index crossplots and the Neutron-Neutron/Fracture Index cross plots and the best relationship is selected (by at least square fit or by "eyeball"). The range of lithology groups is arbitrary, the number and range of groups can be varied to suit different geological environments and to obtain the most accurate calibration constants.

It is important to note that although large 'L' values smooth the Hydrogen Index, the Neutron-Neutron and Fracture Index logs, they must not be permitted to smooth together different lithology sub-groups for calibrations. Consequently, large 'L' values operate only on the Hydrogen Index, Neutron-Neutron response and Fracture Index for continuously similar sections of that lithology sub-group—any lithology units 'contaminated' as a result of the smoothing process are eliminated from calculation of the calibration constants.

Figure 3:
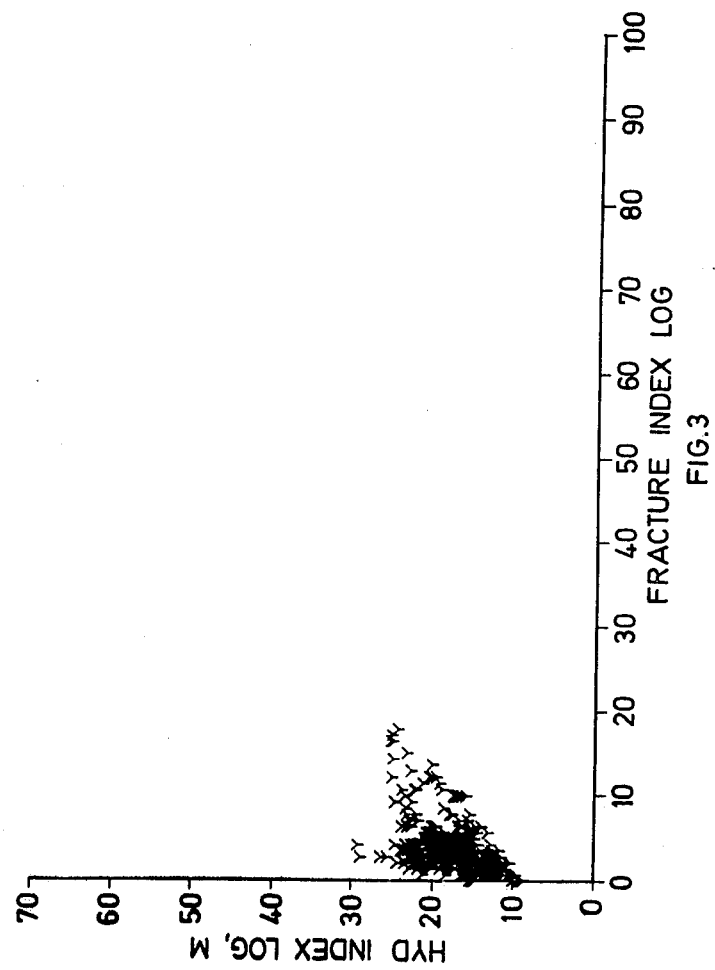
FIG. 3 is a plot of the Hydrogen Index log of FIG. 1 against the Crack Density log of FIG. 2, for one lithology group.

FIG. 3 shows a cross-plot of Hydrogen Index and Fracture Index for a specific lithological group including only the points uncontaminated by the smoothing process.

For the compilation of Bulk Rock Strength (z)—the Hydrogen Index log is amended at each lithology sub-group according to the calibration coefficients a and b:

$$z = ax + b$$

In both examples during the compilation of Bulk Rock Strength (z) all lithology group 1 (coal) are removed from consideration an replaced in the final printed log by "bars". This is preferred because (a) coal is hydrocarbon and therefore responds significantly differently on the respective log to the other Coal Measure rocks; (b) the mechanical strength of coal is well established and presents no engineering difficulties and (c) of convention of displaying coal horizons in the finished Bulk Rock Strength log as "bars" has some value in the case of stratigraphic identification in the finished Bulk Rock Strength log.

Figure 4:
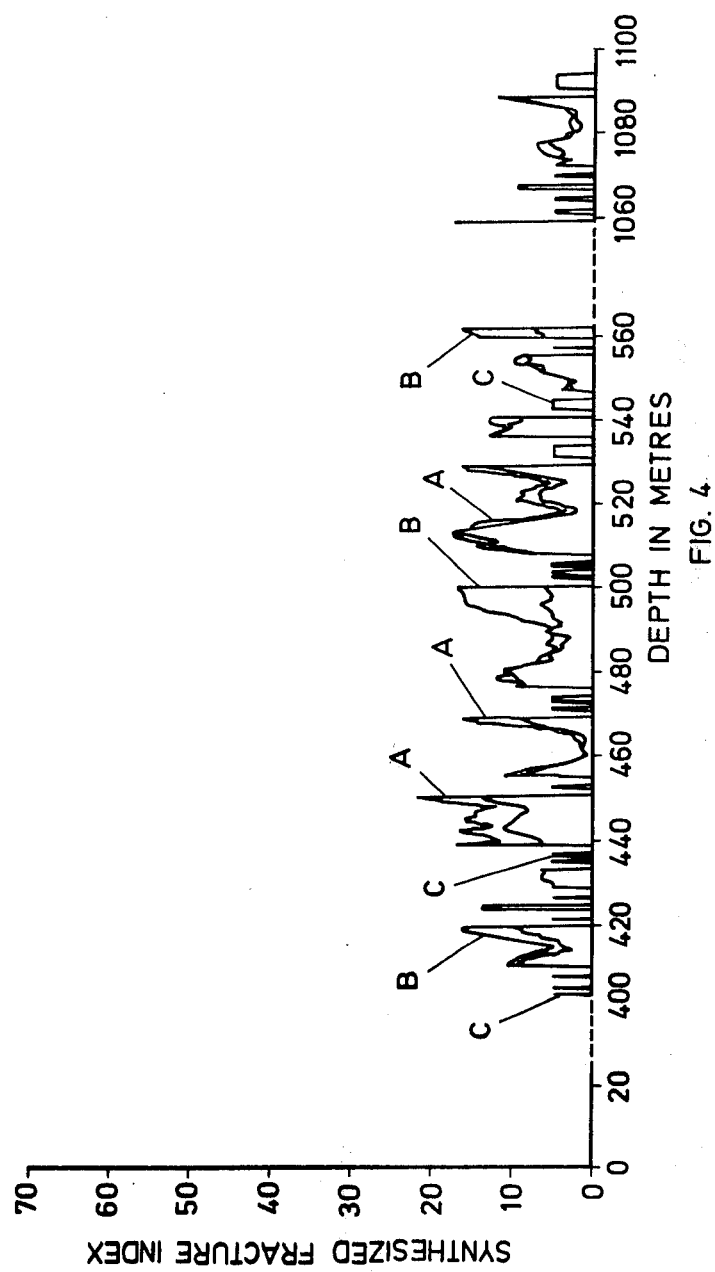
FIG. 4 is a plot of the Bulk Rock Strength, obtained by modifying the Hydrogen Index log according to this invention, super-imposed on the Fracture Index log for the purposes of comparison.

FIGS. 4 and 8 show a display of derived Bulk Rock Strength A superimposed on the synthetic Fracture Index B. The intermediate "bars" C are coal. The 'L' value used in FIGS. 4 and 8 is 21. The identity between the logs A and B indicates in each example the accuracy of the invention. The Bulk Rock Strength log, which in these examples is a synthesized Fracture Index (Crack Density) log can readily be used to produce other rock quality and/or strength logs (e.g., R.Q.D.).

It will be appreciated from the foregoing that an accurate Bulk Rock Strength log can be readily computed from either the Hydrogen Index or the Neutron-Neutron log and a lithology log and that a set of calibration constants has been derived which relates to the Coal Measure rocks. For use in sedimentary environments other than Coal Measure rocks, a relevant set of calibration constants can be derived from a suitable borehole by compiling a conventional Fracture Index log.

In these examples Fracture Indices have been used as the reference or basis for the process of deriving a Bulk Rock Strength log from a Hydrogen Index log and a Neutron-Neutron log. The Fracture Index log is not crucial to the process of deriving a Bulk Rock Strength log from either a Hydrogen Index or a Neutron-Neutron log. The principle of this invention is that for purposes of calibration a Bulk Rock Strength log can be derived from a Hydrogen Index or a Neutron-Neutron log using any rock strength, rock quality or rock property log. A tolerable (although inferior) Bulk Rock Strength log can even be derived from either a Hydrogen Index or a Neutron-Neutron log using no calibration constants or additional rock quality log, that is to say that the Neutron-Neutron log alone represents a crude Bulk Rock Strength log.

The use of the invention thus enables an accurate indication of strength to be obtained more easily and speedily than hitherto.

We claim:

1. A method of determining the bulk strength of strata including the steps of drilling a borehole in strata, moving an instrument along the borehole and determining a Hydrogen Index log of the strata through which the instrument passes, determining for the strata surrounding the hole the lithology of the strata, progressively modifying the Hydrogen Index by a predetermined mathematical function referred to as the calibration constants for each lithology group encountered in the borehole to produce a modified Hydrogen Index log to produce a Bulk Rock Strength log which is an indication of the bulk strengths of the strata through which the borehole was drilled, the bulk rock strength log being expressed algebraically in the form $$z = ax + b$$

where z=bulk rock strength, a and b=derived calibration constants for each lithological group of sub-division of a group and x=the Hydrogen Index.

2. A method as claimed in claim 1 and including the further step of using a caliper log to provide information to correct for borehole rugosity and the derivation of the Hydrogen Index log.

3. A method as claimed in claim 1 in which the bulk rock strength z is related to the Hydrogen Index x by any polynominal expression $$\text{such as, } z = f(x)$$

with derived calibration constants for each polynominal expression used for each lithological group or sub-division of a group.

4. A method according to claim 1 in which the Hydrogen Index log is derived from a Neutron-Neutron log.

5. A method according to claim 1 in which the Hydrogen Index log is derived from a Neutron-Gamma log.

6. A method according to claim 1 in which the lithologies encountered by the boreholes are obtained from visual inspection of core samples.

7. A method as claimed in claim 6 in which the Fracture Index log is obtained by visual inspection of core samples.

8. A method according to claim 1 in which the lithologies encountered by the boreholes are obtained by manual interpretation of conventional down-hole geophysical logs.

9. A method according to claim 1 in which the lithologies encountered by the boreholes are detailed by computer processing of conventional down-hole geophysical logs.

10. A method according to claim 1 incorporating the further step of applying a filtering factor to the Hydrogen Index log.

11. A method according to claim 1 incorporating the further step of applying a filtering factor to the Fracture Index log for purposes of establishing calibration constants.

12. A method according to claim 1 incorporating the further step of applying a filtering factor to the lithology log with the provision that the filtering factor may only smooth over continuously similar sections of a particular lithology sub-group and with the further provision that any lithology units contaminated as a result of the smoothing process are eliminated from calculations of the calibration constants.

13. A method of determining the bulk strength of strata including the steps of drilling a borehole in strata, moving an instrument along the borehole and determining a Neutron-Neutron log of the strata through which the instrument passes, determining for the strata surrounding the hole the lithology of the strata progressively modifying the Neutron-Neutron log by a predetermined mathematical function referred to as the calibration constants for each lithology group encountered in the borehole to produce a modified Neutron-Neutron log to produce a Bulk Rock Strength log which is an indication of the bulk strengths of the strata through which the borehole was drilled.

14. A method as claimed in claim 13 in which the bulk rock strength z is given in the form:

$$z = (a/x) + b$$

where a and b are derived calibration constants for each lithological group and x is the Neutron-Neutron response.

15. A method as claimed in claim 13 in which the bulk rock strength z is related to the Neutron-Neutron response x by any polynomial expression or mathematical function, such as, $x = f(x)$ with derived calibration constants for each polynomial expression used for each lithological group.

16. A method as claimed in claim 14 in which a caliper log is used to compensate for borehole rugosity in the calculation of the bulk rock strength.

17. A method according to claim 13 in which the Neutron-Neutron log is replaced by a Neutron-Gamma log.

18. A method according to claim 13 in which the lithologies encountered by the boreholes are obtained from visual inspection of core samples.

19. A method as claimed in claim 18 in which the Fracture Index log is obtained by visual inspection of core samples.

20. A method according to claim 13 in which the lithologies encountered by the boreholes are obtained by manual interpretation of conventional down-hole geophysical logs.

21. A method according to claim 13 in which the lithologies encountered by the boreholes are detailed by computer processing of conventional down-hole geophysical logs.

22. A method according to claim 13 incorporating the further step of applying a filtering factor to the Neutron-Neutron log.

23. A method according to claim 13 incorporating the further step of applying a filtering factor to the lithology log with the provision that the filtering factor may only smooth over continuously similar sections of a particular lighology sub group and with the further provision that any lithology units contaminated as a result of the smoothing process are eliminated from calculations of the calibration constants.

* * * * *

UNITED STATES PATENT OFFICE
CERTIFICATE OF CORRECTION

PATENT NO. : 4,445,032

DATED : April 24, 1984

INVENTOR(S) : Halker et al

It is certified that error appears in the above-identified patent and that said Letters Patent are hereby corrected as shown below:

On the title page, Item [75] should read:

Inventors: Anthony Halker, Stoke-on-Trent; David W. Mellor, Congleton; Keith R. Whitworth, Castle Bank; Nicholas J. Kusznir, Audlem, all of England Signed and Sealed this Thirtieth Day of April 1985

[SEAL]

Attest:

DONALD J. QUIGG

*Attesting Officer*     *Acting Commissioner of Patents and Trademarks*